United States Patent [19]

Masashi et al.

[11] Patent Number: 5,574,714
[45] Date of Patent: Nov. 12, 1996

[54] AMPLIFIER WITH PEAK AND BOTTOM SIGNAL LEVEL SHIFTING CONTROL

[75] Inventors: Arai Masashi; Tsukihashi Akira, both of Oizumi, Japan

[73] Assignee: Sanyo Electric Co., Ltd., Osaka, Japan

[21] Appl. No.: 342,488

[22] Filed: Nov. 21, 1994

[30] Foreign Application Priority Data

Nov. 22, 1993 [JP] Japan ................................ 5-291999

[51] Int. Cl.⁶ ........................... H03G 3/20; G11B 7/00
[52] U.S. Cl. ........................ 369/124; 330/254; 330/296
[58] Field of Search ........................ 369/124; 330/291, 330/296, 277, 311, 254, 279; 327/58, 79

[56] References Cited

U.S. PATENT DOCUMENTS

| | | | |
|---|---|---|---|
| 4,075,576 | 2/1978 | Eden | 330/277 |
| 4,219,152 | 8/1980 | Couch et al. | 327/58 |
| 4,795,919 | 1/1989 | Tanikoshi et al. | 327/79 |
| 5,030,923 | 7/1991 | Arai | 330/254 |

FOREIGN PATENT DOCUMENTS

| | | |
|---|---|---|
| 0381394 | 8/1990 | European Pat. Off. . |
| 0478314 | 4/1992 | European Pat. Off. . |
| 3259428 | 11/1990 | Japan . |
| 5046991 | 2/1993 | Japan . |
| 5062212 | 3/1993 | Japan . |
| 5144033 | 6/1993 | Japan . |

*Primary Examiner*—Georgia Y. Epps
*Assistant Examiner*—Kim-Kwok Chu
*Attorney, Agent, or Firm*—Loeb & Loeb LLP

[57] ABSTRACT

A signal level adjusting unit adjusts levels of EFM signals, read from an optical disk, to given levels, and comprises a peak value detector, a peak value comparing circuit issuing a control signal on the basis of the difference between a peak value and a reference value, a bottom value detector, a bottom value comparing circuit issuing a shift signal in accordance with a difference between a bottom value and a reference value, an amplifier amplifying the EFM signal with an amplification factor in response to the control signal, and a level shift circuit level-shifting the EFM signals in response to the level shift signals.

10 Claims, 4 Drawing Sheets

AMPLIFIER WITH PEAK AND BOTTOM SIGNAL LEVEL SHIFTING CONTROL

BACKGROUND OF THE INVENTION

1. Field of the Invention

This invention relates to a signal level adjusting unit for adjusting a level of an eight-fourteen-modulation (EFM) signal to a given level, which EFM signal is read from an optical disk in an optical disk player such as a compact disk (CD) player, laser disk (LD) player or the like.

2. Description of the Prior Art

FIG. 1 of the accompanying drawings shows a circuit, which is used to reproduce EFM signals indicative of read digital data of an optical disk in a conventional 3-beam type optical disk player. Such an optical disk player uses three beams, i.e. a main beam for digital data reading and focus control and two sub-beams for tracking control. Referring to FIG. 1, the main beam reflected on the optical disk is detected by four photodiodes 1–4. A signal detected by the photodiodes 1 and 2, and a signal detected by the photodiodes 3 and 4 are amplified by amplifiers 5 and 6, respectively, and are added by an adder 7. Thus, the EFM signals are reproduced, amplified by an amplifier 8, and transmitted to succeeding circuits via an output terminal 9.

Thereafter, the EFM signals are subject to clock signal processing and error correction processing, and then are demodulated into audio data. The EFM signals may have a waveform as shown in FIG. 2A if laser beams pass on a compact disk which is defective on its surface. Further, the EFM signals may have a waveform as shown in FIG. 2B if the laser beams pass across a plurality of rows of tracks. The EFM signals not only include data such as audio data but are also used to detect a defect on the optical disk on the basis of the waveform as shown in FIG. 2A or determine a position of the main beam on the optical disk during access on the basis of the waveform shown in FIG. 2B.

Therefore, the EFM signals are very important from the viewpoint of reproducing sounds and performing subsequent processing and detection. Use of the circuit of FIG. 1 allows the reproduction of the EFM signals.

In the 3-beam type optical disk player, when detecting reflected beams by letting the main beam track a pit row, an amount of light in the reflected beams varies with a size of the pit. Therefore, peak and bottom values of an EFM signal are variable as shown in FIG. 2C. Further, optical disks have different values of reflectance, and reflect different beams of differing extents. Thus, signal levels of the EFM signals are different in optical disks. Further, the peak and bottom values of the EFM signals are different in respective optical disks.

The EFM signals undergo waveform shaping so as to facilitate processing in succeeding stages. According to the circuit shown in FIG. 1, the EFM signals are only amplified by the amplifier 8. If amplifiers 5 and 6 have small gains, the levels of the EFM signals will be low, so that the EFM signals cannot be correctly waveform-shaped due to noise. To overcome this problem, the gains of the amplifiers 5 and 6 are increased so that the EFM signals have a high level. Then, the EFM signals are waveform-shaped. However, if detected EFM signals have a high level, they may be clipped when they are amplified by the dynamic ranges of the amplifiers 5 and 6.

There is another problem as described below. Variations of the level b (i.e. the bottom value) of the EFM signals are detected on the basis of the waveform as shown in FIG. 2(B) so as to detect whether the laser beams pass across a plurality of rows of tracks. In such a case, since optical disks have different EFM signals, sometimes the detected level b may be below a predetermined threshold level. Therefore, the variations of the level b cannot be detected, and it is not possible to determine whether the laser beams pass across a plurality of rows of tracks.

SUMMARY OF THE INVENTION

In order to overcome problems of the conventional signal level adjusting unit, it is an object of the invention to provide a signal level adjusting unit. The signal level adjusting unit comprises: a amplifier, which amplifies input signals and varies an amplification factor thereof in response to a first control signal; a level shift circuit for level-shifting an output signal of the amplifier in response to a second control signal; a peak value control circuit for detecting a peak value of the output signal of the level shift circuit and issuing the first control signal to vary an amplification ratio of the amplifier so that the peak value becomes a first given value; and a bottom value control circuit for detecting a bottom value of the output signal of the level shift circuit and issuing a second control signal to vary a shift amount of the level shift circuit so that the bottom value becomes equal to a second given value. The input signal is an EFM signal read out from an optical disk.

According to an aspect of the invention, an input signal is amplified by the amplifier, and is level-shifted by the level shift circuit. An output signal of the level shift circuit is transmitted to succeeding circuits, and is also applied to the peak and bottom value control circuit. The peak value control circuit detects a peak value of the output signal, provides the first control signal to the amplifier, and controls the peak value of the output signal to the first given value. The bottom value control circuit detects the bottom value of the output signal, provides the second control signals to the level shift circuit, and controls the bottom value of the output signal of the level shift circuit to the second given value.

BRIEF DESCRIPTION OF THE DRAWINGS

In all drawing figures, identical parts have identical reference numerals.

DESCRIPTION OF PREFERRED EMBODIMENT

Figure 1:
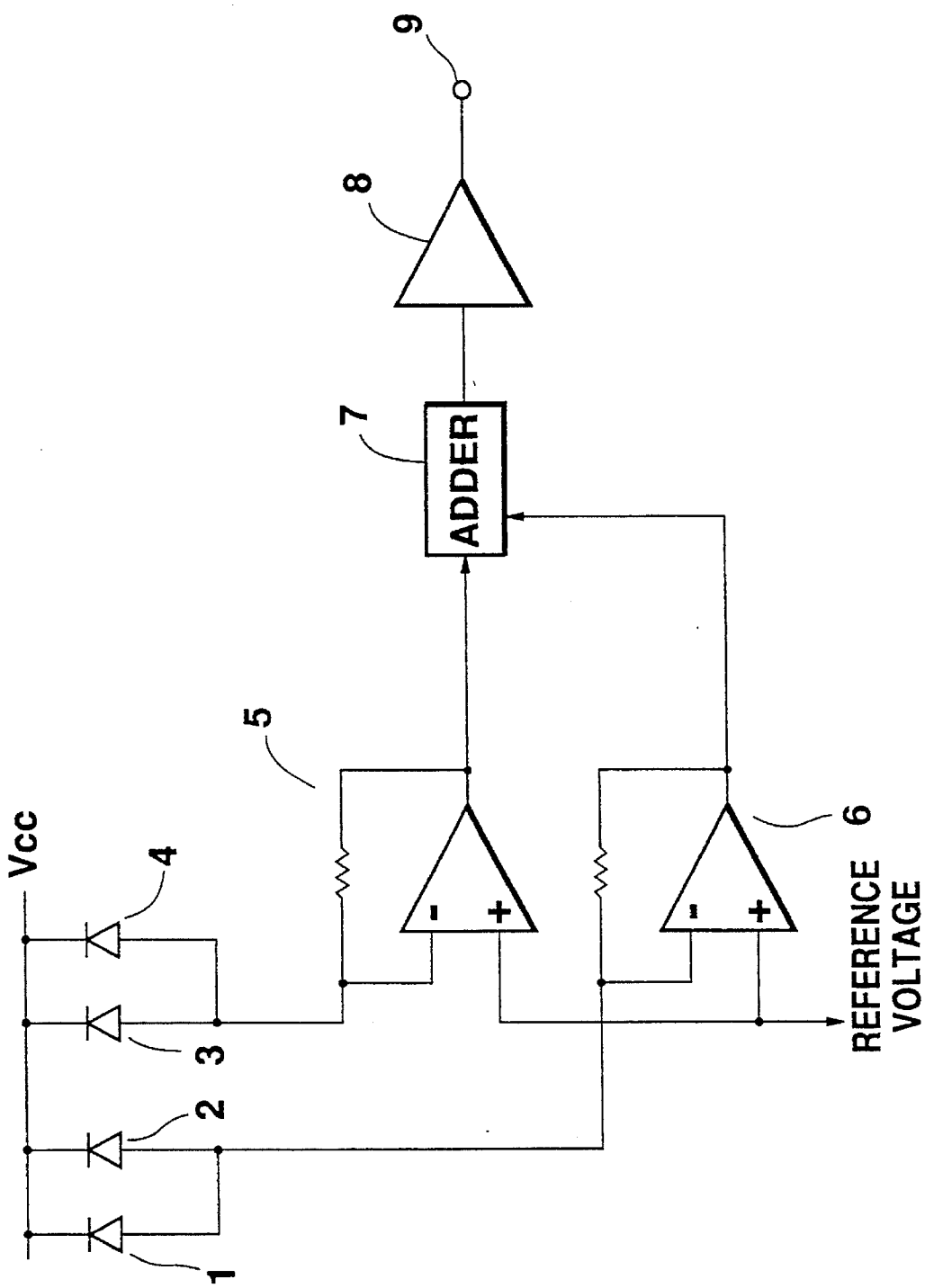
FIG. 1 is a block diagram showing the configuration of a conventional signal level adjusting unit.
Figure 2A:
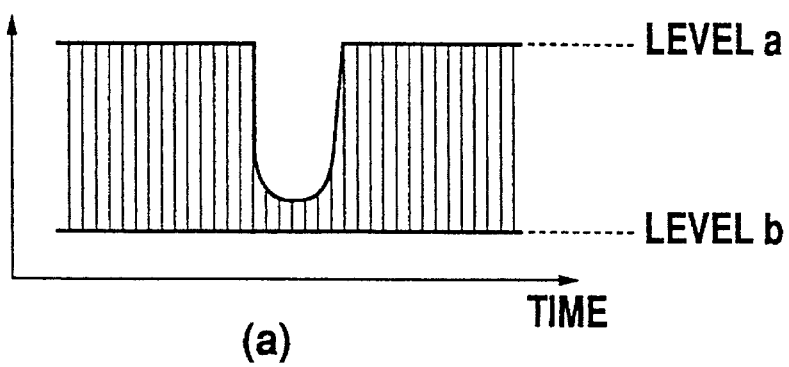
FIGS. 2A to 2C show waveforms of conventional EFM signals.
Figure 2B:
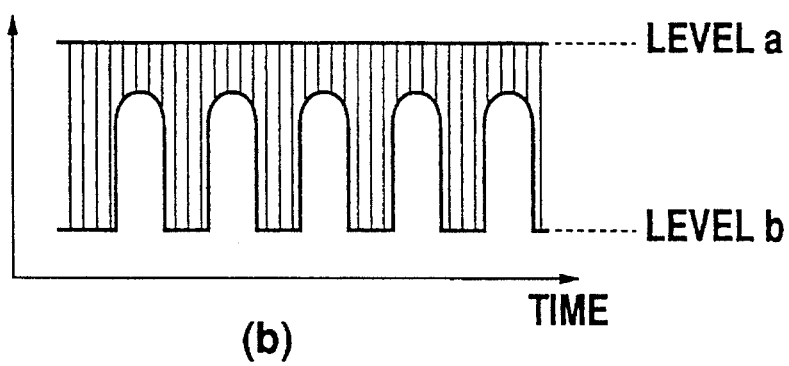
Figure 2C:
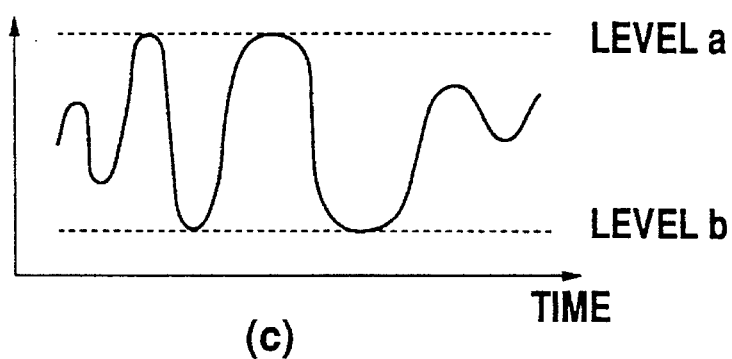
Figure 3:
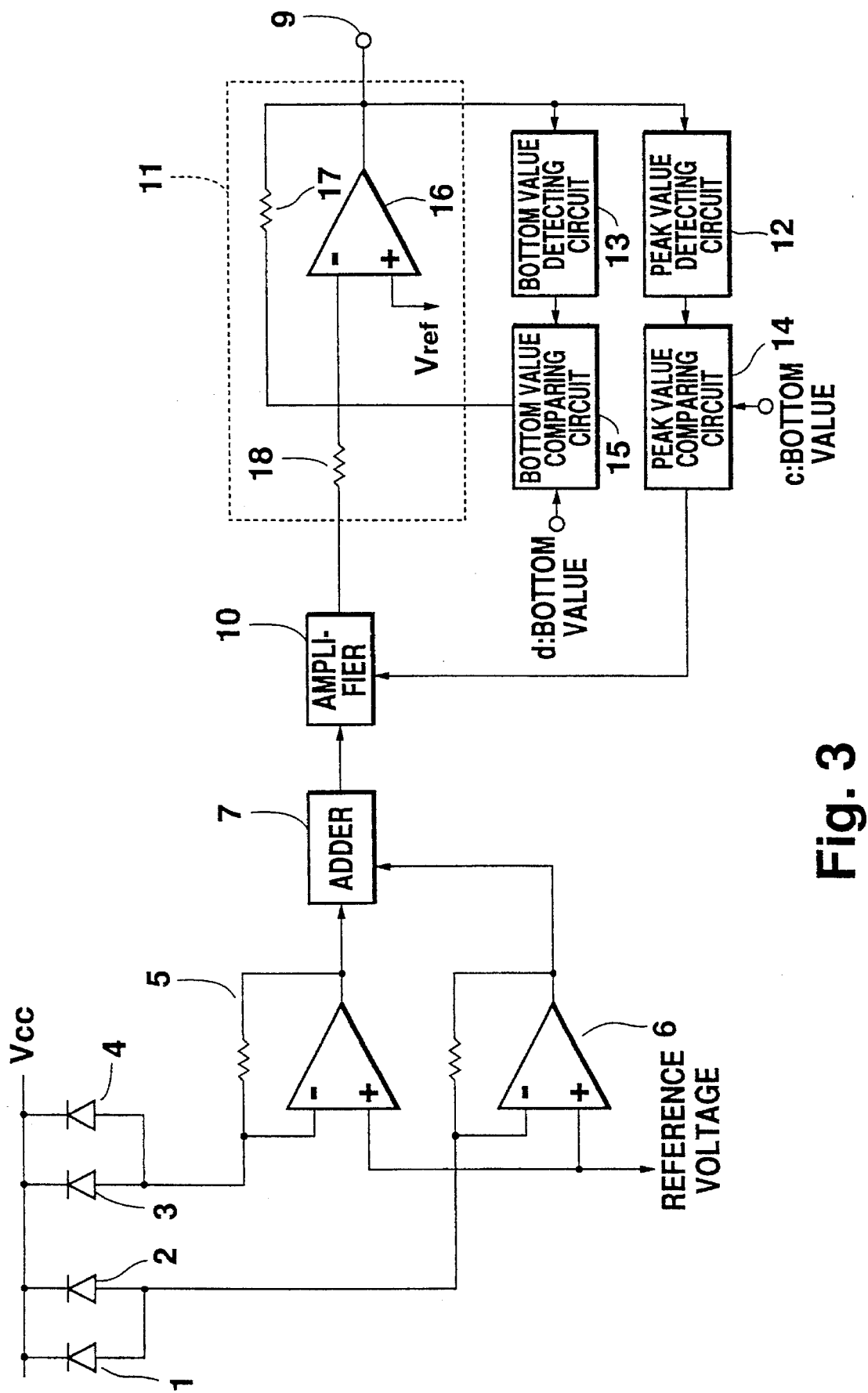
FIG. 3 is a block diagram showing the configuration of a signal level adjusting unit according to an embodiment of the invention.

Referring to FIG. 3, a signal level adjusting unit comprises photodiodes 1–4, a amplifier 10 whose gain is variable in response to a control signal, a level shift circuit 11 for level-shifting an output signal of the amplifier 10, a peak value detector 12 for detecting a peak value of the output signal of the level shift circuit 11, a bottom value detector 13 for detecting a bottom value of the output signal of the level shift circuit 11, a peak value comparing circuit 14 for comparing an output value of the peak value detector 12 with a reference value c, and a bottom value comparing circuit 15 for comparing an output value of the bottom value detector 13 with a reference value d.

As shown in FIG. 3, signals detected by the photodiodes 1–4 are added by an adder 7 so as to generate EFM signals. The EFM signals are amplified by the amplifier 10, level-shifted by the level shift circuit 11, and transmitted to succeeding circuits. An output signal of the level shift circuit 11 is applied not only to the peak value detector 12 but also to the bottom value detector 13. The peak value detector 12 detects the peak value of the output signal of the level shift circuit 11. The detected peak value is compared with a reference signal c by the peak value comparing circuit 14. The peak value comparing circuit 14 issues a control signal on the basis of a difference between the peak value and the reference value c, and varies the gain of the amplifier 10 in response to the control signal. Therefore, the peak value of the EFM signals amplified by the amplifier 10 becomes equal to the reference value c.

The bottom value detector 13 detects the bottom value of the output signal of the level shift circuit 11. The bottom value is compared with a reference value d. In accordance with a difference between the compared values, a shift signal will be issued by the bottom value comparing circuit 15. The shift signal is mixed with an output signal of the amplifier 10 at an input terminal of the shift circuit 11. The bottom value is level-shifted in response to the shift signal, so that the bottom value of the EFM signal becomes equal to the reference value d.

When it is recognized that the peak value exceeds the reference value c, the peak value comparing circuit 14 issues a control signal, in response to which the gain of the amplifier 10 and the peak value of the EFM signals are reduced. Conversely, when the peak value is smaller than the reference value c, the amplifier 10 has a large gain, and a maximum value becomes large.

When the bottom value is recognized as being larger than the reference value d, the bottom value comparing circuit 15 issues a shift signal having a high level. In such a case, the shift circuit 8 shifts the level of the EFM signals to reduce it, thereby reducing the bottom value. Conversely, when the bottom value is smaller than the reference value c, the shift signal has a low level, and the bottom value is level-shifted to become larger.

The shift circuit 11 includes an amplifier 16 and resistors 17 and 18. Assuming that the resistors 17 and 18 have resistance values R1 and R2, the amplifier 13 will have a gain of –R1/R2. The gain depends upon the resistance values. A voltage $V_{out}$ generated at an output of the amplifier 13 depends upon the resistance value R1 and a current I across the resistor 17, i.e. $V_{out}=-R1\times I$. The voltage $V_{out}$ is made variable by varying the current generated by the bottom value comparing circuit 15 as the shift signal. In other words, the level of the EFM signal can be shifted in accordance with the level of the shift signal.

In operation, the EFM signals will be controlled to the reference values c and d as follows. Each EFM signal is amplified by the amplifier 10 according to the amplification factor determined by the difference between the peak value and the reference value. Thus, the peak value becomes equal to the reference value c, and the bottom value becomes larger. The level shift circuit 11 shifts the level of the EFM signal by the shift amount depending upon the difference between the detected bottom value and the reference value d. Thus, the bottom value becomes equal to the reference value d. When the EFM signal has its level shifted, the peak value will deviate from the reference value c. The EFM signal will be amplified on the basis of an amplification factor determined by a difference between a detected new peak value and the reference value c. Then, the peak value will become equal to the reference value c. When the EFM signal is further amplified, the bottom value will deviate from the reference value d. The EFM signal is again level-shifted in accordance with a difference between a detected new bottom value and the reference value d, so that the bottom value becomes equal to the reference value d. The foregoing operation is repeated until the differences between the peak value and the reference value c and between the bottom value and the reference value d become smaller, and the peak and bottom values are controlled to the reference values c and d.

Figure 4:
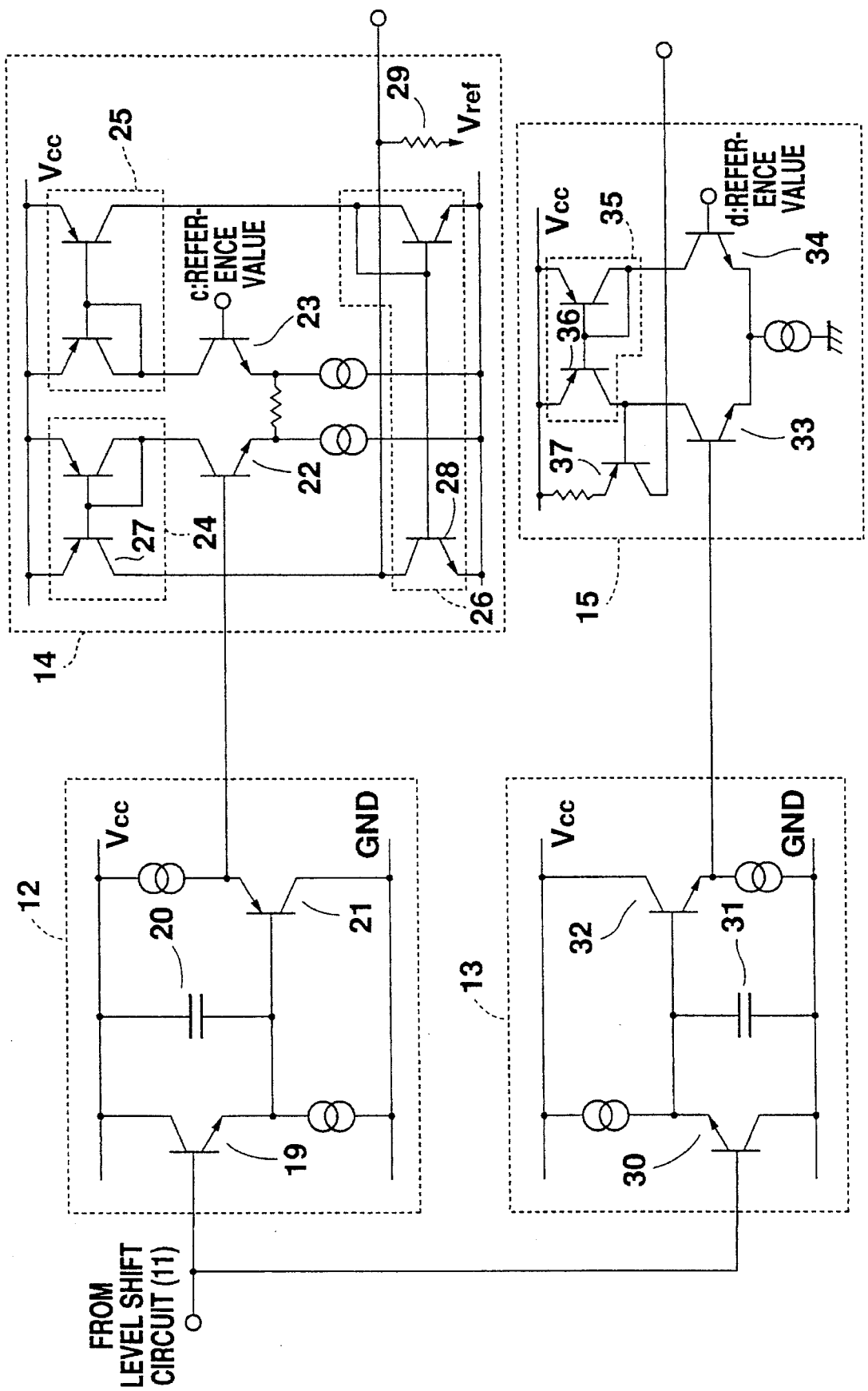
FIG. 4 is a circuit diagram showing a peak value detector, a bottom value detector, a peak value comparing circuit, and a bottom value comparing circuit of the signal level adjusting unit shown in FIG. 1.

Referring to FIG. 4, the EFM signals generated by the level shift circuit 11 are applied to the peak value detector 12 and the bottom value detector 13. The EFM signal applied to the peak value detector 12 has its level shifted by a transistor 19. A voltage, which is generated at a terminal of a capacitor 20 by charging and discharging the capacitor 20 with a collector current, is level-shifted by a transistor 21 so as to detect a peak value. The peak value is applied to a base of the transistor 22 in the peak value comparing circuit 14, and is compared with the reference value c applied to a base of a transistor 22. A collector current of the transistor 22 is converted into a collector current of a transistor 27 via a current mirror 24. A collector current of a transistor 23 is converted into a collector current of a transistor 28 via current mirrors 25 and 26. Then, a difference between the peak value and the reference value c is represented by a difference between the currents of the transistors 27 and 28. A current depending upon a difference between the collector currents of the transistors 27 and 28 are subject to voltage conversion by a resistor 29, and are applied to the amplifier 10 as a shift signal.

The EFM signal applied to the bottom value detector 13 is level-shifted by a transistor 30. A voltage, which is generated at a terminal of a capacitor 31 by charging and discharging the capacitor 31 with a collector current of the transistor 30, is level-shifted by a transistor 32, thereby detecting a bottom value. The bottom value is applied to a base of a transistor 33 in the bottom value comparing circuit 15, and is compared with the reference value d applied to a base of a transistor 34. The collector current of the transistor 34 is converted into a collector current of a transistor 36 via a current mirror 35.

A base current of a transistor 37 is determined by a difference between the collector currents of the transistors 33 and 37. Therefore, the base current of the transistor 37 is determined by a difference between the bottom value and the reference value d. A collector current of the transistor 37 is generated in accordance with the foregoing base current, and is supplied to the level shift circuit 11 as a shift signal.

According to the invention, the level of the EFM signals read from the optical disk can be controlled to a desired level, so that correct data is obtainable from the EFM signals without being affected by noise, and can be effectively used for processing in succeeding stages.

What is claimed is:

1. A signal level adjusting unit comprising:
   an amplifier that amplifies an input signal, and varying an amplification factor thereof in response to a first control signal;

a level shift circuit that DC level shifts an output signal of the amplifier in response to a second control signal;

a peak value control circuit that detects a peak value of the output signal from the level shift circuit, and issuing the first control signal for varying the amplification factor of the amplifier so that the peak value becomes equal to a first given value; and a bottom value control circuit that detects a bottom value of the output signal from the level shift circuit, and issuing the second control signal to vary a shift amount of the level shift circuit so that the bottom value becomes equal to a second given value.

2. The signal level adjusting unit according to claim 1, wherein the input signal is an EFM signal read out from an optical disk.

3. The signal level adjusting unit according to claim 1, wherein the peak value control circuit includes a peak detecting circuit that detects a peak of an output signal from the level shift circuit, and a peak comparing circuit that compares an output signal from the peak detecting circuit with the first given value and issuing the first control signal indicative of a difference therebetween, and wherein the bottom value control circuit includes a bottom value detecting circuit that detects a bottom value of an output signal from the level shift circuit, and a bottom value comparing circuit that compares an output signal from the bottom value detecting circuit with the second given value and issuing the second control signal indicative of a difference therebetween.

4. The signal level adjusting unit according to claim 3, wherein the level shift circuit includes: an operation amplifier having a positive input terminal for receiving a given reference voltage, a negative terminal for receiving an input signal and an output terminal for sending an amplified signal; a first resistor connected to the negative terminal of the operation amplifier, attenuating the input signal and providing the attenuated signal to the negative terminal of the operation amplifier; and a second resistor disposed in a feed-back path between the output terminal and the negative input terminal of the operation amplifier, and wherein the second control signal is a current signal for adjusting an amount of current to be supplied to the negative input terminal.

5. A signal level adjusting unit comprising:

an amplifier means for amplifying an input signal, and varying an amplification factor thereof in response to a first control signal:

a level shift means for DC level-shifting an output signal of the amplifier means in response to a second control signal;

a peak value control means for detecting a peak value of the output signal from the level shift means, and issuing the first control signal for varying the amplification factor of the amplifier means so that the peak value becomes equal to a first given value; and a bottom value control means for detecting a bottom value of the output signal from the level shift means, and issuing the second control signal to vary a shift amount of the level shift means so that the bottom value becomes equal to a second given value.

6. The signal level adjusting unit according to claim 5, wherein the input signal is an eight-fourteen-modulation (EFM) signal read out from an optical disk.

7. The signal level adjusting unit according to claim 5, wherein the peak value control means includes a peak detecting means for detecting a peak of an output signal from the level shift means and a peak comparing means for comparing an output signal from the peak detecting means with the first given value and issuing the first control signal indicative of a difference therebetween, and wherein the bottom value control means includes a bottom value detecting means for detecting a bottom value of an output signal from the level shift means, and a bottom value comparing means for comparing an output signal from the bottom value detecting means with the second given value and issuing the second control signal indicative of a difference therebetween.

8. The signal level adjusting unit according to claim 7, wherein the level shift means includes: an operational amplifier means having a positive input terminal for receiving a given reference voltage, a negative terminal for receiving an input signal and an output terminal for sending an amplified signal; a first resistor means connected to the negative terminal of the operational amplifier means, attenuating the input signal and providing the attenuated signal to the negative terminal of the operational amplifier means; and a second resistor means disposed in a feed-back path between the output terminal and the negative input terminal of the operational amplifier means, and wherein the second control signal is a current signal for adjusting an amount of current to be supplied to the negative input terminal.

9. A method of signal level adjusting comprising the steps of:

amplifying an input signal, and varying an amplification factor thereof in response to a first control signal:

DC level-shifting the amplified input signal to form an output signal in response to a second control signal;

detecting a peak value of the level shifted output signal;

issuing the first control signal for varying the amplification factor so that the peak value becomes equal to a first given value;

detecting a bottom value of the level shifted output signal; and issuing the second control signal to vary a shift amount of the level shift step so that the bottom value becomes equal to a second given value.

10. The method according to claim 9, wherein the step of detecting the peak value includes detecting a peak of the level shifted output signal, and comparing the peak with the first given value and issuing the first control signal indicative of a difference therebetween, and wherein the step of detecting the bottom value includes detecting a bottom of level shifted output signal, and comparing the bottom with the second given value and issuing the second control signal indicative of a difference therebetween.

\* \* \* \* \*